May 8, 1951  J. N. SELVIG  2,551,855
APPARATUS FOR TREATING FIBROUS STALKS
Filed Dec. 20, 1944  9 Sheets-Sheet 1
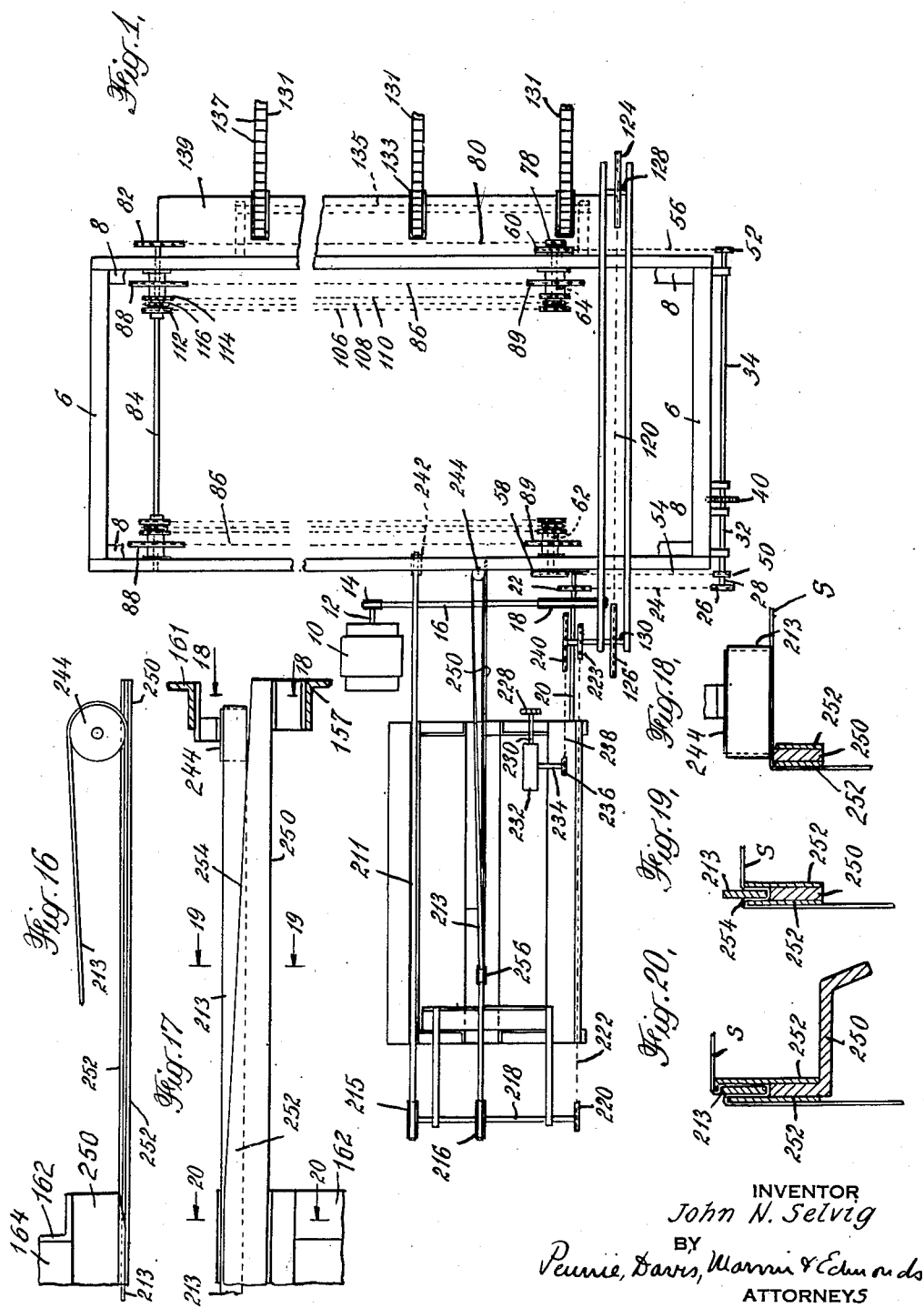
INVENTOR
John N. Selvig
BY
Pennie, Davis, Marvin & Edmonds
ATTORNEYS

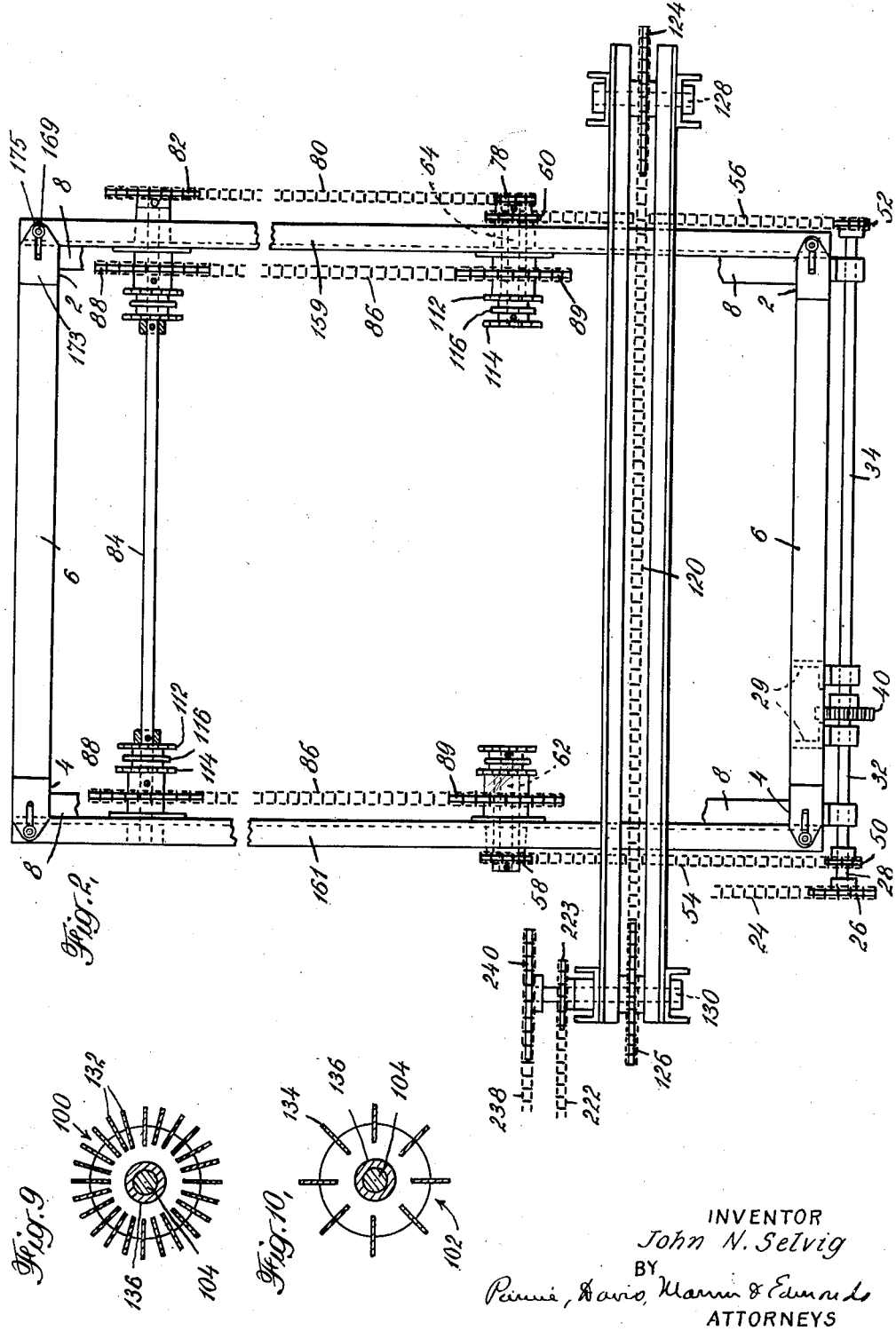

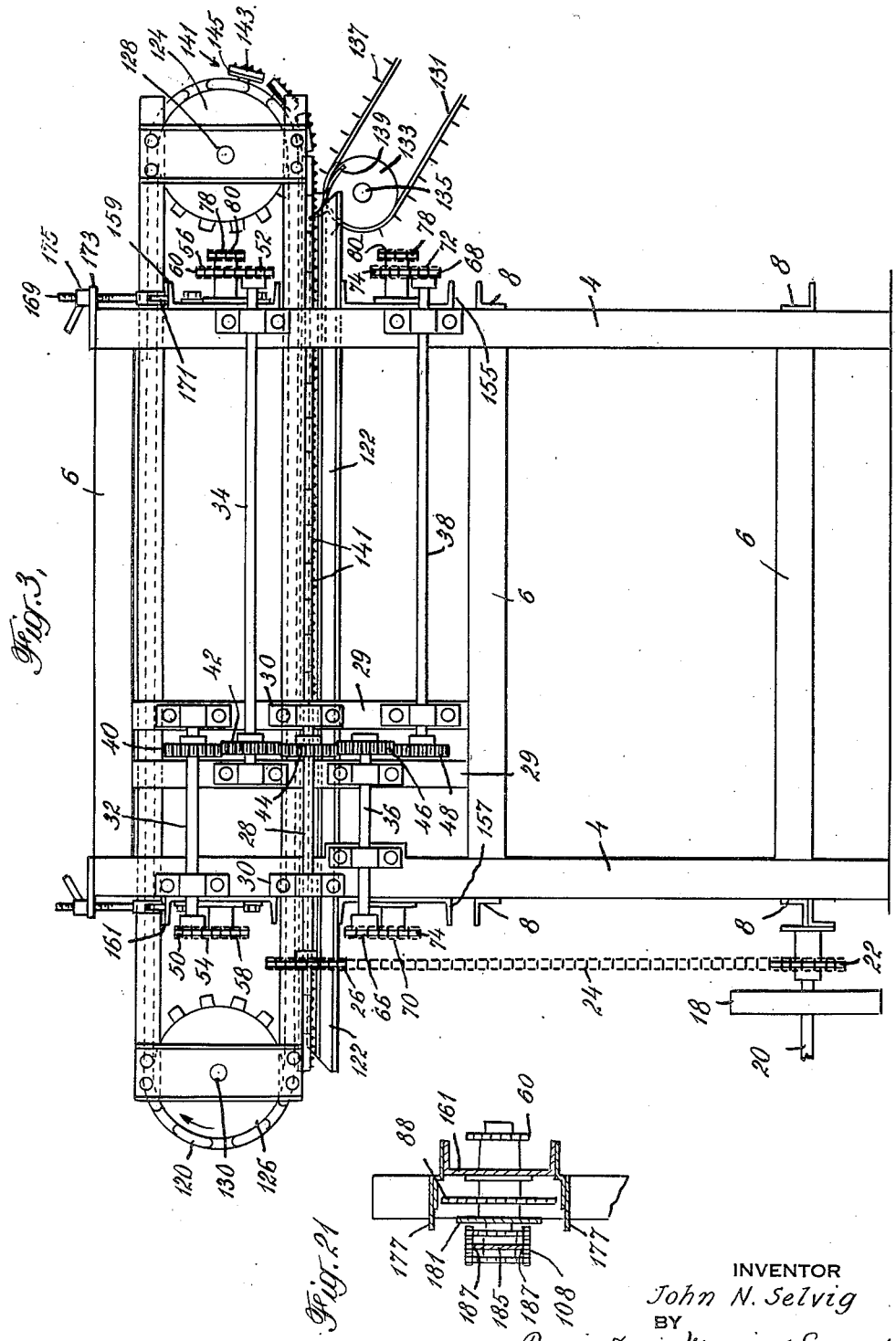

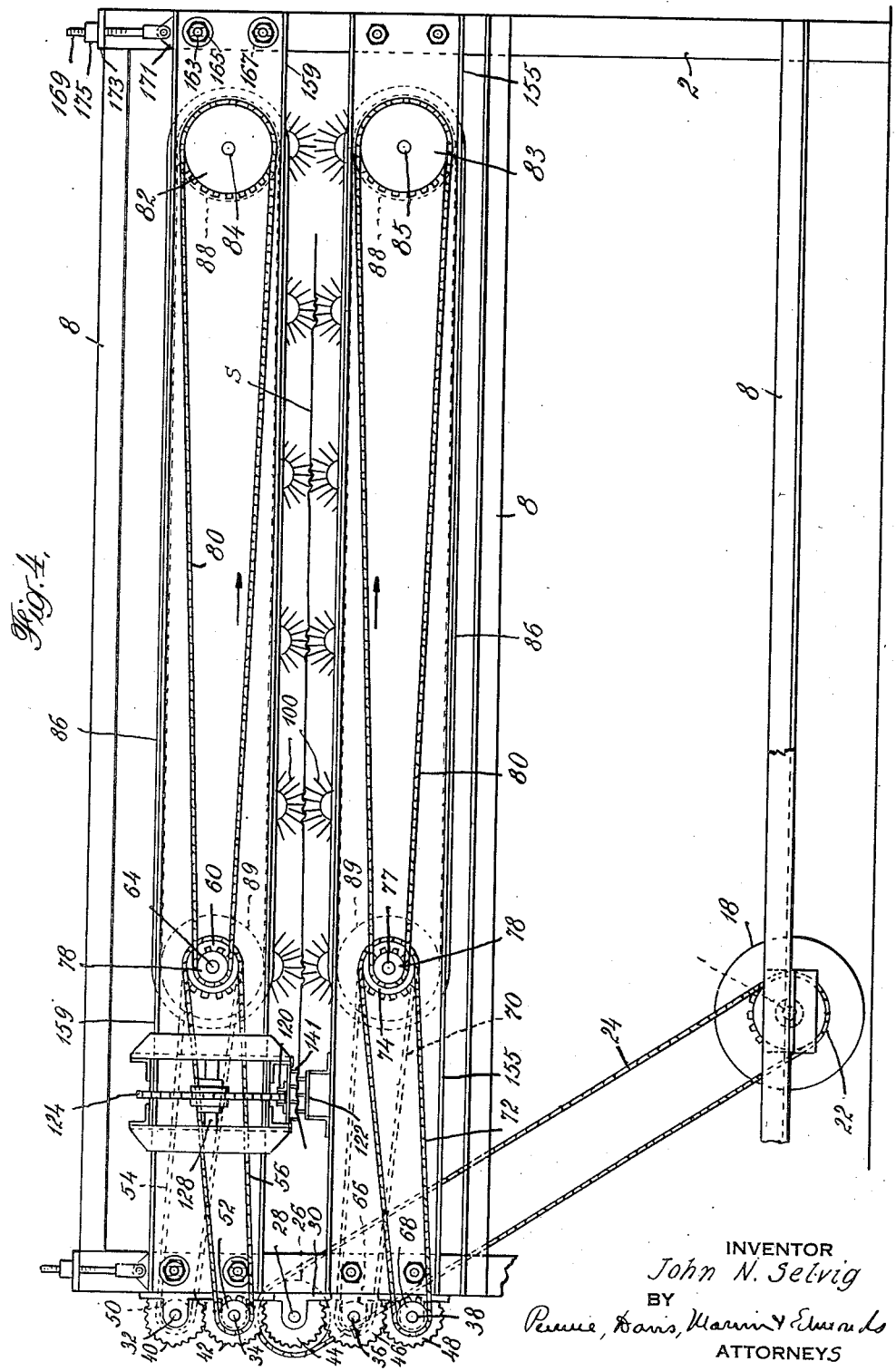

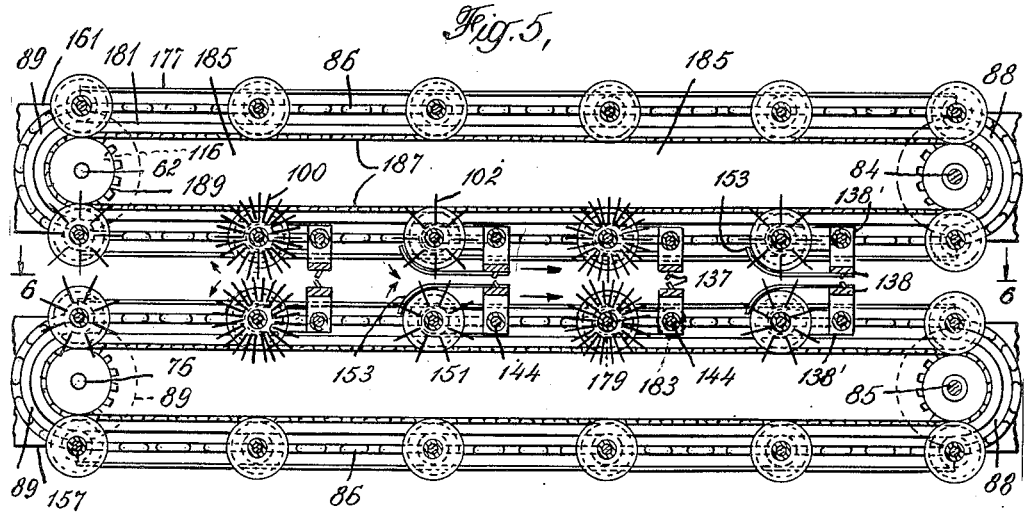
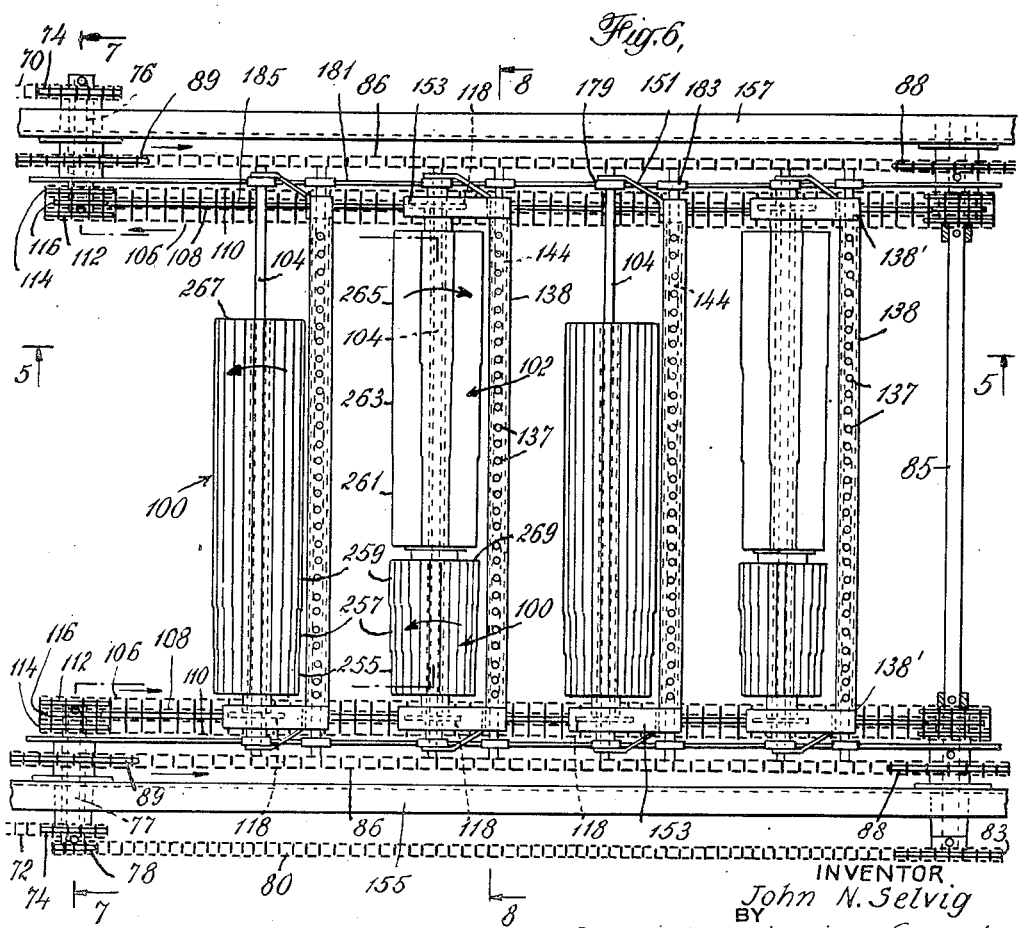

May 8, 1951           J. N. SELVIG           2,551,855
APPARATUS FOR TREATING FIBROUS STALKS
Filed Dec. 20, 1944           9 Sheets-Sheet 6
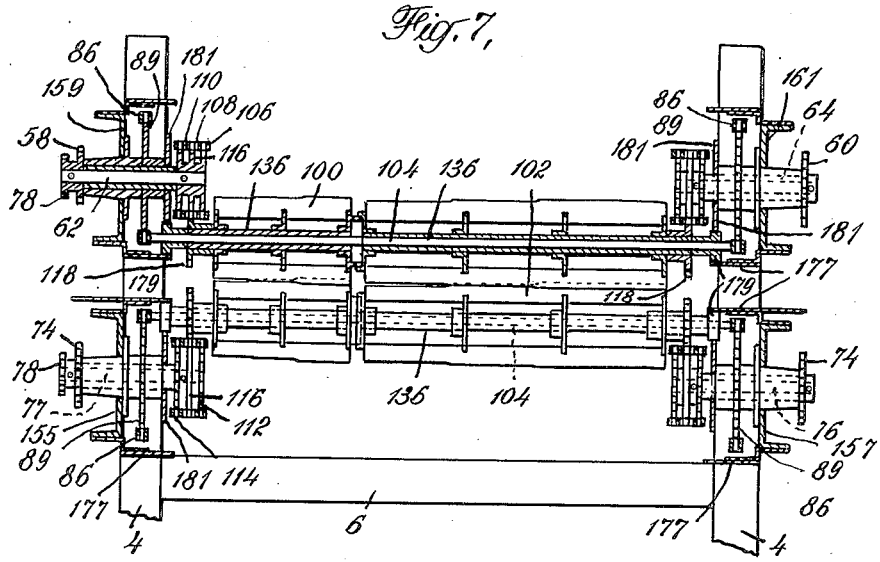
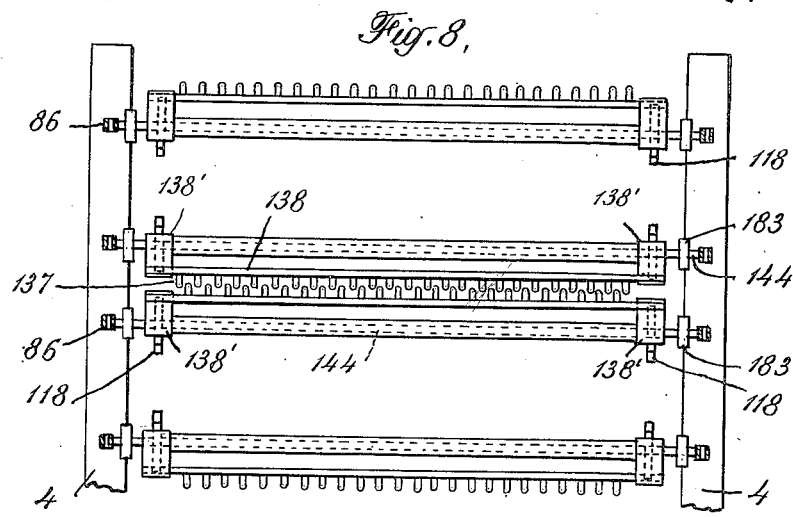
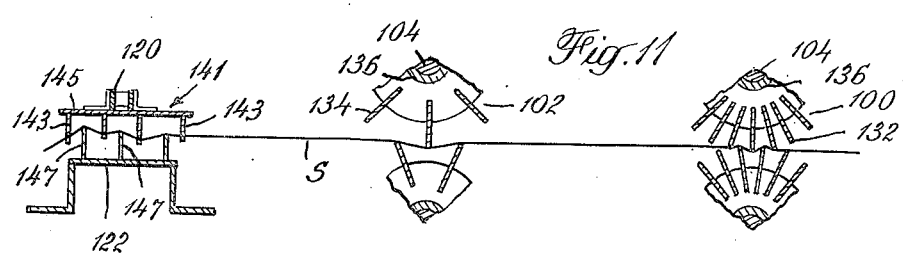
INVENTOR
John N. Selvig
BY
Pennie, Davis, Marvin & Edmonds
ATTORNEYS May 8, 1951 J. N. SELVIG 2,551,855
APPARATUS FOR TREATING FIBROUS STALKS
Filed Dec. 20, 1944 9 Sheets-Sheet 7

INVENTOR
John N. Selvig
BY
Pennie, Davis, Marvin & Edmonds
ATTORNEYS

Patented May 8, 1951

2,551,855

UNITED STATES PATENT OFFICE 2,551,855

APPARATUS FOR TREATING FIBROUS STALKS

John N. Selvig, Westfield, N. J.

Application December 20, 1944, Serial No. 569,008

12 Claims. (Cl. 19—12)

This invention relates to apparatus for treating fibrous material and more particularly to apparatus for liberating fibers from fibrous material, such as hemp, flax, jute and the like.

It is an object of my invention to provide an apparatus which will effectively loosen the fibers from the stem, break the woody core of the fiber bearing stem into short pieces, submit the material to a combined breaking and gentle scutching action to remove the bulk of the broken woody material, and then submit the partly cleaned fibers to a more severe scutching action to completely remove the remaining woody material without breaking, weakening or otherwise injuring the fibers.

A more specific object is to employ the approved method of breaking the woody fibrous material between two rotating fluted rolls, but whereas the rolls in the old method are mounted in fixed bearings and the material to be treated is fed, more or less loose and out of control, between the rolls, the rolls of the present invention are fastened to chain belts which move them over the fibrous material, while the material to be treated is securely held by the feeding means and carried forward substantially parallel with the axes of the rolls. The rotative speed of the rolls is controlled by a novel chain mechanism which correctly mates the flutes of the opposed rollers and rotates the rolls so that the engaging flutes move slowly in a backward direction as the rolls move forward over the fibrous material, so that the fibers are under no additional strain while under the breaking action of the rolls.

To further provide a proper breaking action, the diameter of the rolls is increased by steps up to about one-third of their length so that the flute of one roll will engage deeper and deeper in to the space between the flutes of the opposing roll thereby insuring a gentle action on the material at the first contact with the rolls which increases in severity as the material is carried forward by the feed belt.

The scutching of the fibers is accomplished by high speed drums which are fastened and carried forward by the same chain belt that carries the breaking rolls. The scutching begins at the point where the stems have been thoroughly broken and is at first gentle in order to remove the bulk of the shives and increases in severity as the partly cleaned fibers are advanced toward the rear end. This is accomplished by increasing by steps the diameter of the scutching drums, so that the bars of one drum interlap deeper in between the bars of the opposed mate. The rotation of these drums is controlled by a similar chain mechanism that controls the breaking rolls but is located at the rear end of the machine. The chain mechanism travels in the opposite direction from that at the front of the machine, whereby the engaging bars at the point of contact with the fibers are rotated in the same direction as the forward motion of the rolls. The machine preferably consists of two units together with suitable transfer mechanism whereby the portion of the material engaged by the feed chain in passing through the first unit of the machine is submitted to the breaking and scutching operations in the second unit of the machine.

Referring to the drawings:

Fig. 1 is a plan view of the machine with certain of the operating parts removed to more clearly illustrate the drive mechanism;

Fig. 2 is a similar view of the horizontal portion of the machine on an enlarged scale;

Fig. 3 is a side elevation looking from the bottom of the sheet in Fig. 1;

Fig. 4 is a front elevation looking from the right in Fig. 1;

Fig. 5 is a vertical, sectional view on line 5—5 of Fig. 6;

Fig. 6 is a horizontal, sectional view on line 6—6 of Fig. 5;

Fig. 7 is a longitudinal, vertical, sectional view on line 7—7 of Fig. 6;

Fig. 8 is a similar view on line 8—8 of Fig. 6;

Fig. 9 is an end view of one of the breaking rolls;

Fig. 10 is a similar view of one of the scutching drums;

Fig. 11 is a detailed view showing the arrangement of the rolls with respect to the feed mechanism;

Fig. 16 is a side elevation of a portion of the transfer mechanism by which the stalks are delivered from the horizontal portion of the machine to the vertical portion;

Fig. 17 is a plan view of the parts shown in Fig. 16;

Figure 12:
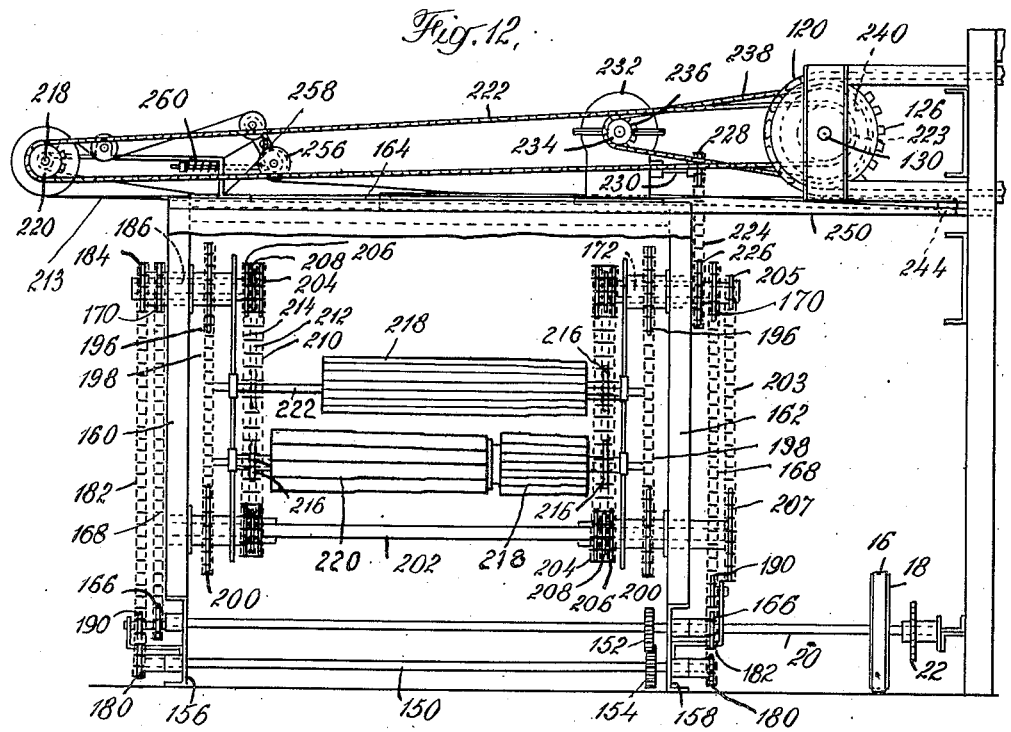
Fig. 12 is a side elevation of the vertical unit of the machine, parts of the mechanism being removed to more clearly illustrate the drive.
Figure 13:
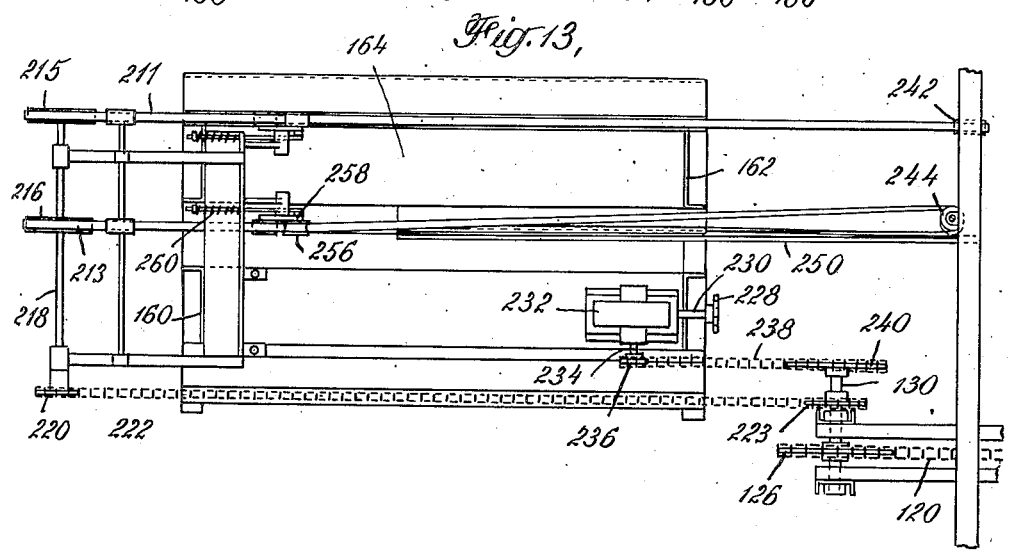
Fig. 13 is a plan view of the parts shown in Fig. 12.

Figs. 18, 19 and 20 are detailed, sectional views on lines 18—18, 19—19 and 20—20, respectively, of Fig. 17; and Fig. 21 is a detailed, sectional view showing the means for supporting the chains to prevent sagging of the chains and to retain the breaking rolls and scutching drums in proper alignment during the operative flights of the chains.

Referring first to the horizontal machine, it consists of a suitable frame work comprising upright members 2 and 4 (see Fig. 3), longitudinal, horizontal members 6 and transverse, horizontal members 8. The machine is driven from a motor 10 (see Fig. 1) having a motor shaft 12 with a pulley 14 mounted thereon. Pulley 14 receives a belt 16 which also passes over a pulley 18 on a main drive shaft 20. Shaft 20 carries a sprocket 22 which receives a chain 24, and this chain passes over a second sprocket 26 mounted on a shaft 28 at the side of the machine (see Figs. 1, 3 and 4).

Shaft 28 is supported in brackets 30 carried by the vertical member 4 and auxiliary vertical members 29 (see Fig. 3). An upper pair of shafts 32 and 34 and a lower pair of shafts 36 and 38 are arranged adjacent the shaft 28, the shafts 32 and 36 extending to the rear of the machine, and the shafts 34 and 38 to the front. The shafts 28, 32, 34, 36 and 38 are connected to each other by suitable gears 40, 42, 44, 46 and 48. The ends of shafts 32 and 34 are provided with sprockets 50 and 52 over which pass chains 54 and 56, respectively. These chains in turn pass over sprockets 58 and 60 mounted on stub shafts 62 and 64, respectively (see Fig. 2).

Similarly shafts 36 and 38 carry sprockets 66 and 68 at their opposite ends which receive chains 70 and 72, respectively. These chains pass over sprockets 74 mounted on a pair of lower aligned stub shafts 76 and 77 similar to the upper shafts 62 and 64. Each of the shafts 64 and 77 is provided with a sprocket 78 to receive chains 80 which extend across the machine and pass over sprockets 82 and 83 mounted on shafts 84 and 85. There are thus pairs of upper and lower aligned stub shafts arranged at one side of the machine, the aligned shafts being rotated in opposite directions because those at the rear of the machine are driven from the shafts 32 and 36 whereas those at the front of the machine are driven from the shafts 34 and 38 which rotate in the opposite direction.

The main operating chains 86, by means of which the rolls are carried (see Fig. 6), are driven from the shafts 84 and 85. Sprockets 88 are mounted on shafts 84 and 85, each sprocket being fast to its respective shaft. As the shafts 84 and 85 revolve in opposite directions being driven from the shafts 32 and 36, respectively, each pair of upper and lower chains 86 on their operative flight travel in the same direction. The opposite ends of these chains pass over sprockets 89 carried by sleeves which are loosely mounted on the stub shafts 62, 64, 76 and 77.

Breaking rolls 100 and scutching drums 102 (see Fig. 6) are mounted on rods or shafts 104 extending from the drive chains 86 at front of the machine to the drive chains at the rear, being aligned with the center of the chain roller and secured to the chains in any suitable manner (see Fig. 7). These rolls and drums are also rotated on their own axes, the breaking rolls being driven by suitable chains at the front of the machine to drive them in one direction and the scutching drums being driven by similar chains at the rear of the machine to drive them in the opposite direction. As shown (see Fig. 6) a triple roller chain 106, 108 and 110 is provided at the front and rear of the machine. The inner chain 108 engages sprockets 118 mounted on the breaking rolls and the scutching drums to rotate them on their own axes. At the end of each flight, the outer chains 106 and 110 pass over sprockets 112 and 114 on the stub shafts and on the shafts 84 and 85 (see Fig. 1). These sprockets are formed on suitable hubs mounted on the shafts and between them there is provided a toothless disc 116 over which the center chain 108 passes. The teeth are omitted from the center disc to permit the teeth of the sprockets 118 to clear the discs as the roller chains pass around them at the end of each flight. Rods or shafts 104, on which the breaking rolls and scutching drums are mounted, are aligned with the center of the drive chain 86.

By securing the sprockets 112, 114 and 116 to the stub shafts, and loosely mounting the other sets on the shafts 84 and 85, the chains 106, 108 and 110 are driven in the proper direction to rotate the breaking rolls in one direction and the scutching drums in the opposite direction. Thus, referring to Fig. 6 of the drawings, where the aligned lower stub shafts 76 and 77 are shown, these shafts, being driven from shafts 36 and 38, respectively, rotate in opposite directions. The sprockets 112 to 116, carried by these shafts, are fast to the shafts and the sprockets 112 to 116 at the opposite ends which are mounted on the shafts 84 and 85, are carried by sleeves loosely mounted on the shafts.

The stalks are carried through the horizontal machine by a feed chain 120 traveling over a suitable guide or bed plate 122 and passing over sprockets 124 and 126 mounted on shafts 128 and 130. Shaft 130 is driven from the main drive shaft 20 through suitable gear reduction to carry the stalks through the machine at the desired speed. The stalks are delivered to the machine by a conveyor consisting of a plurality of inclined belts 131 (see Figs. 1 and 3) which pass over the pulleys 133 on a shaft 135 at the front of the machine, the belts, at the other end of their flight, passing over similar pulleys on a similar shaft (not shown). The belts are provided with spaced projections or upright members 137 to retain the stalks in positions at right angles to the path of travel. The feed chain carries a plurality of shoes 141 similar in construction to the feed mechanism disclosed in my prior Patent No. 2,078,419, granted April 27, 1937. These shoes are provided with longitudinally projecting ribs 143 and transversely projecting ribs 145. The bed plate 122 is likewise provided with longitudinally projecting ribs 147 and the stalks are grasped between these ribs and crimped so as to be carried forwardly by the chain. The angle of crimping is not sufficient to break the stalks but insures longitudinal movement of the stalks through the machine and is sufficient to resist any pull on the stalks by the action of the rolls and drums. Adjacent the forward end of the machine I provide a curved apron 139 to insure passage of the stalks from the conveyors 137 to the feed chain (see Fig. 1).

A more detailed disclosure of the rolls and the drive mechanism therefor is shown in Figs. 7 to 11 of the drawings. As shown in Fig. 7, the rods 104 extend across the machine and are connected to the chains 86. The breaking rolls 100 are mounted on these rods adjacent the inlet side of the feed chain and the scutching drums 102 are mounted adjacent the outlet end of the feed chain. The breaking rolls are provided with a plurality of radially arranged plates or bars 132 which extend beyond the surface of the roll, forming ribs or projections with flutes between them and the scutching drums are provided with a smaller number of similarly arranged plates or bars 134. The rotation of the breaking rolls and scutching drums by the triple chains insures proper mating of the flutes and ribs with the ribs on one roll meshing with the flutes of the mating roll and engaging the stalks to properly treat the stalks and fibers. To further insure proper treatment, the rolls are stepped (see Fig. 6). Adjacent the front of the machine the breaking rolls are provided with sections of smallest diameter as shown at 255 to submit the stalks to a gentle breaking operation at the outset. As the stalks advance through the machine, they are engaged by the next sections 257 of the breaking rolls which are of greater diameter and submit the stalks to a more vigorous treatment. Finally the stalks are submitted to breaking operation by the portions 259 of the breaking rolls which are of the greatest diameter.

Likewise the scutching operation is progressive. The first section 261 of the scutching drums being of smallest diameter, the next section 263 being of greater diameter and the final section 265 being of the greatest diameter. It will also be noted (see Fig. 6) that the rolls and drums of both the upper and lower set are arranged in units of two breaking rolls and a scutching drum. The first breaking roll extends approximately two-thirds the length of the machine and terminates at 267. On the next shaft 104 the breaking roll terminates at about one-third the length of the machine as at 269 and the scutching drum of the unit extends the remainder of the length of the machine. As the fibers are fed through the machine substantially parallel to the axes of the rolls, they are first engaged by the breaking rolls and when they have advanced to the point where the scutching drum of the unit begins, the portion of the stalk engaged by the rolls has been submitted to the breaking operation and is then ready for the separation of the shives from the fibers. Rods 104, being fastened to the chains 86, do not rotate and the rolls are mounted on sleeves 136 which are free to rotate on the rods. The sprockets 118, by means of which the rolls are rotated, are secured to the respective sleeves 136. The breaking rolls are rotated backwardly or oppositely to the direction of movement of the rods 104 to eliminate any pull on the fiber stalks by the forward movement of the breaking rolls. The scutching drums, being driven by the sprockets 112 to 116 at the opposite side of the machine, are driven at a greater speed with their fluted surfaces engaging the fibers in the direction of the forward movement of the chains 86. By arranging the breaking rolls adjacent the inlet side of the feed chain 120, the fiber stalks are fully broken before any scutching action begins.

In the space between the rolls I also provide a series of pointed pins 137 (see Figs. 5 and 6) that project through the fibrous material and straighten out the fibers as they are advanced through the machine by the feed belt. These pins are carried by plates 138, the opposite ends of which are secured to blocks 138', which are free to rotate on rods or shafts 144. These rods or shafts extend across the machine and are connected to the drive chains 86. The plates 138 are also connected to arms 151 which engage the adjacent shafts 104 of the breaking rolls and scutching drums. On the ends of the shafts 104, carrying the sprockets 118 by which the rolls are rotated, the plates carry curved shield plates 153 which extend around the sprockets (see Figs. 5 and 6) to prevent any part of the stalk from becoming entangled in the sprocket and chain.

The mechanism by means of which the rolls are carried and rotated is supported in a pair of transverse members at the front of the machine and a similar pair of members at the rear of the machine. As shown (see Figs. 4 and 7) a lower channel member 155 is secured to the upright members at the front of the machine and a similar channel member 157 is secured to the upright members at the rear of the machine. Upper channel members 159 and 161 are adjustably mounted on the upright members to permit regulation of the spacing between the rolls. The upper members are secured to the vertical members by bolts 163 and nuts 165, the bolts passing through elongated slots 167 in the upright members. A threaded adjusting member 169 is secured to a lug 171 on the upper surface of each of the upper members 159 and 161 adjacent each end and passes through an opening in a flange 173 formed at the top of the upright member. An adjusting nut 175 is arranged on the threaded member 169 above this flange.

Each of the channel members carries plates 177 (see Figs. 7 and 21) on its upper and lower flanges. A guide plate 181 is supported from the frame of the machine and is arranged in the vertical plane of the rollers 179 carried by the shafts 104 and similar rollers 183 carried by the shafts 144. The upper and lower edges of this guide plate are spaced from plates 177 a proper distance to receive the rollers 179 and 183 and thus maintain the chain and the rollers and drums in proper alignment with the desired overlap or clearance on their operative flights.

Likewise plates 185 are arranged in the plane of the toothless wheels over which the triple roller chains pass and the upper and lower edges 187 of this plate are spaced from each other a proper distance to prevent sagging of the triple roller chain and thus cause the chain to mesh with the sprockets on the breaking rolls and scutching drums to properly rotate them on their own axes (see Fig. 21). The plate 185 is similarly supported from the frame of the machine and is curved at each end as at 189 to space it a slight distance from the toothless disc.

Figure 14:
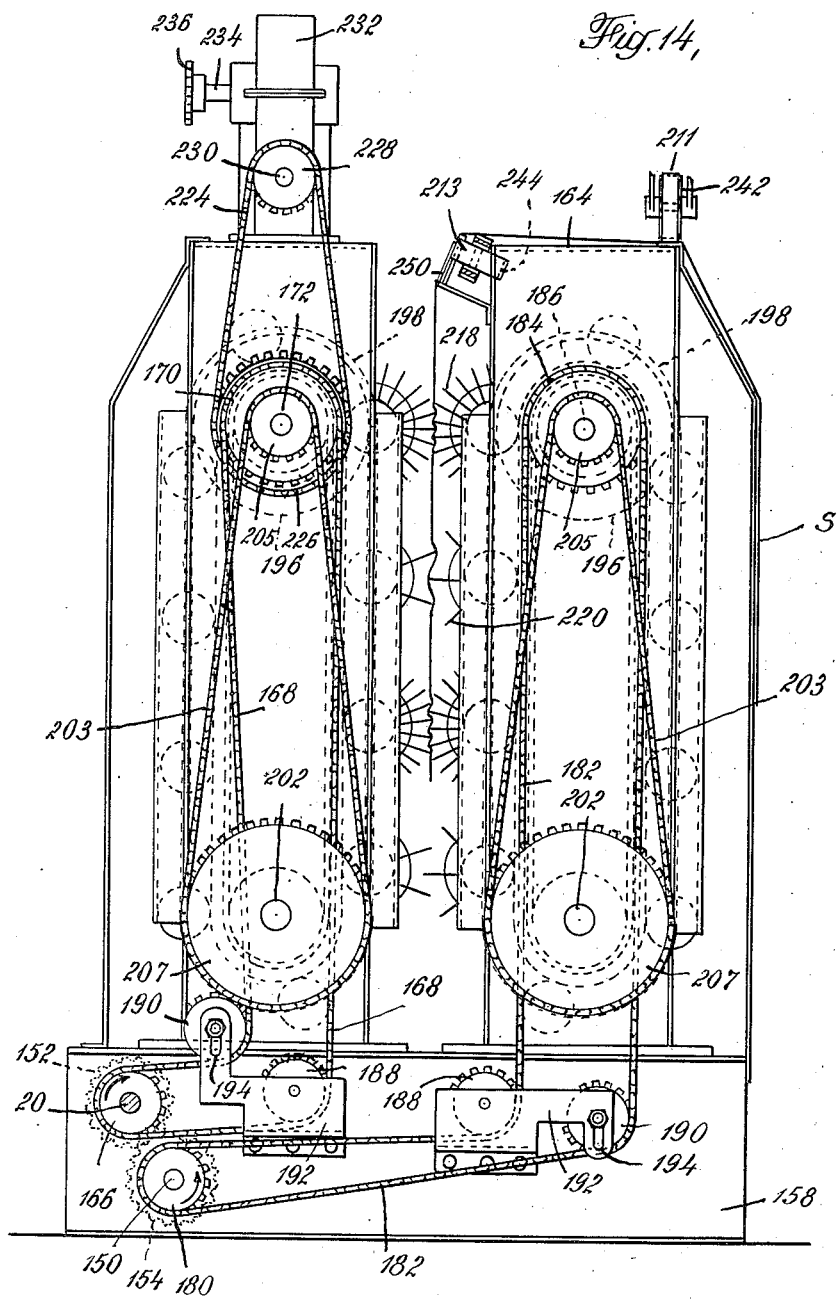
Fig. 14 is an end view of the vertical machine from the right in Fig. 12.
Figure 15:
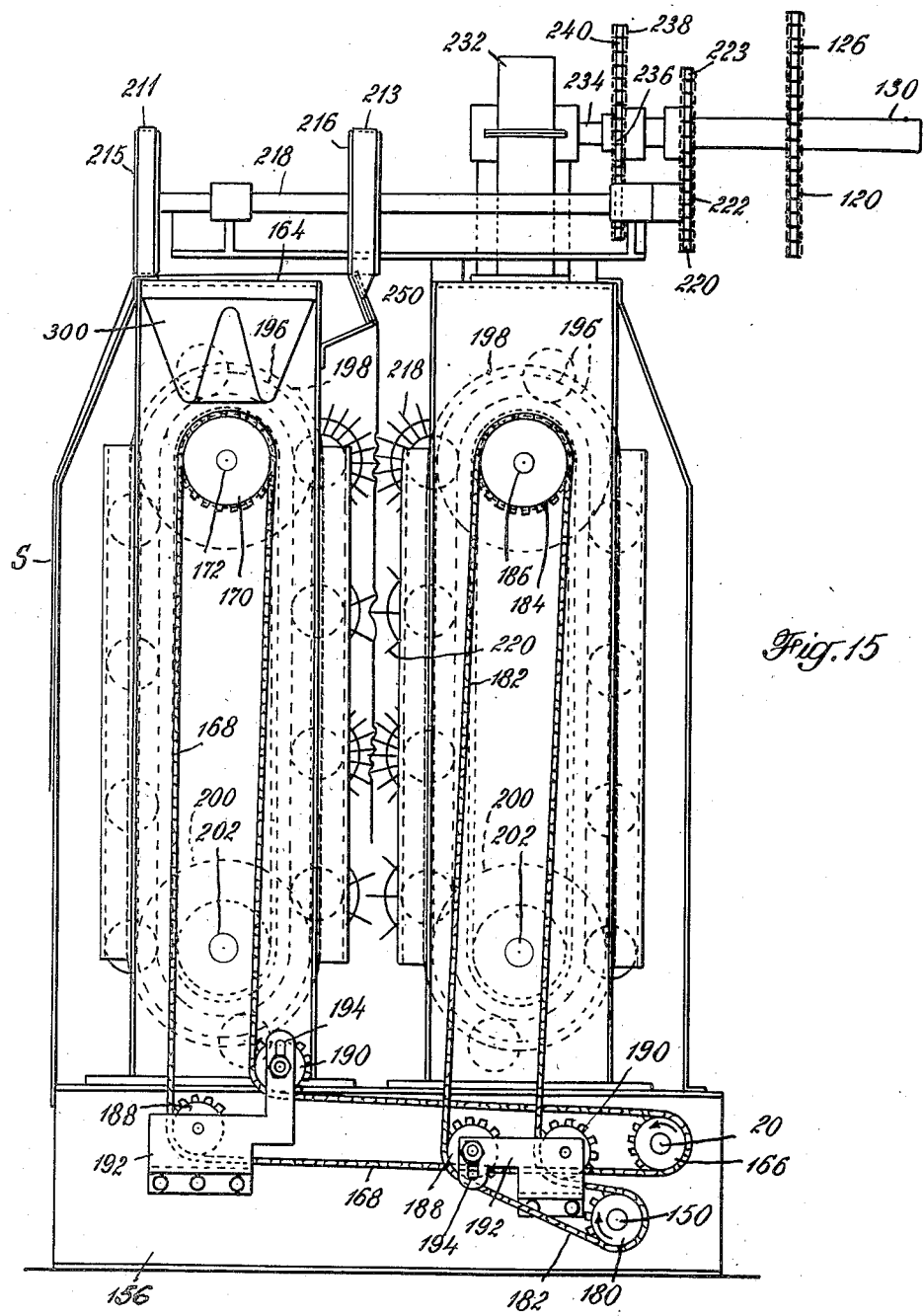
Fig. 15 is a similar view from the left in Fig. 12.

The vertical machine is shown with relation to the horizontal machine in Fig. 1 of the drawings and is shown in detail in Figs. 12 to 20. As shown (see Fig. 12) main shaft 20 extends under the vertical machine and is geared to a second shaft 150 by gears 152 and 154 mounted on the shafts 20 and 150, respectively. The vertical machine is supported on a pair of horizontal members 156 and 158 and provided with a suitable frame consisting of upright members 160 and 162 and a bed or table 164. Shaft 20 is provided with a sprocket 166 adjacent each end of the machine and these sprockets receive chains 168 which pass over sprockets 170 on stub shafts 172 at the top of the machine. Likewise the shaft 150 carries sprockets 180 at each end and these sprockets receive chains 182 passing over sprockets 184 on similar stub shafts 186 arranged in the same horizontal plane with the stub shafts 172, as shown in Fig. 14 of the drawings. These stub shafts correspond to the stub shafts 62, 64, 76 and 77 of the horizontal machine. The chains 168 and 182 each pass over idler sprockets 188 and 190. These idler sprockets are mounted in suitable stub shafts carried by brackets 192 on the frame of the machine and as shown, the shafts of the sprockets 190 are received in elongated slots 194 in these brackets to permit adjustment of the chains.

Stub shafts 172 and 186 carry sprockets 196 and these sprockets receive chains 198 which also pass over sprockets 200 on shafts 202. Shafts 202 are driven from the stub shafts at the right in Fig. 12 by means of a chain 203, corresponding to the chain 80 of the horizontal machine, the chain passing over a sprocket 205 on the stub shaft and a sprocket 207 on the shaft 202. The chains 198 are the roller carrying chains corresponding to the chains 86 of the horizontal machine and the shafts 202 correspond to the shafts 84 and 85. Stub shafts 172 and 186 and shafts 202 also carry pairs of sprockets 204 and 206 and a disc or toothless wheel 208. The sprockets 204 and 206 and the wheels 208 engage triple roller chains 210, 212 and 214. The triple roller chains are driven by sprockets 204 and 206. The middle chains 212 engage sprockets 216 by means of which the breaking rolls 218 and the scutching drums 220 are rotated on their own axes. The rolls and drums are mounted on rods 222 which are secured to the chains 198 and which are similar to the rods 104 of the horizontal machine.

As in connection with the horizontal machine certain of the sprockets are keyed to the shafts 172, 184 and 202 and certain of the sprockets are loosely mounted on these shafts, either because the sprockets turn in the opposite direction from the shafts or because they travel at different speeds from the shafts. Thus, referring to Figs. 12 and 14 of the drawings, Fig. 14 being a view from the right of Fig. 12, it will be noted that the shaft 20 travels in a clockwise direction, which in turn rotates the sprocket 170 in a clockwise direction. As the stub shaft 172 at the left of the machine in Fig. 14 should rotate in a clockwise direction, the sprocket is fast to the shaft. Likewise the sprocket 207 is fast to shaft 202 to rotate it in a clockwise direction. Sprocket 200 is fast to shaft 202, and the other sprocket 196 over which the chain 198 passes, is loose on the stub shaft 172 because the sprocket travels at a different speed from that of the shaft. Likewise, the sprockets 204, 206 and the disc 208 are fast to the shaft 172 and the corresponding set of sprockets on the shaft 202 are loose as they travel at a different speed from that of the shaft.

The set of shafts 186 and 202 at the right side of Fig. 14, being driven from the shaft 150, rotate in a counter-clockwise direction which causes the chain 198 of this half of the machine to travel in the proper direction on its operative flight. The sprockets are either loosely mounted on the shafts or keyed thereto, as the case may be, to drive the various parts in the proper direction and at the proper speeds.

As the material is transferred from the horizontal machine to the vertical machine, those fibers which have been acted on by the rolls of the horizontal machine are received in suitable feed belts and the portion of the stalk which engaged the feed belt 120 of the horizontal machine is fed downwardly between the two sets of rolls to be acted on by the vertical machine. Because the material is fed through the second unit by engagement of the fibers, instead of engagement of the stalks as in the first unit, a different type of feeding mechanism is necessary. As shown (see Figs. 14 and 15), a pair of feed belts 211 and 213 extend over the bed or table of the vertical machine. These belts pass over pulleys 215 and 216 at the outlet side of the vertical machine, the pulleys being mounted on a shaft 218 (see Fig. 1). Shaft 218 carries a sprocket 220 which is driven from shaft 130 by a chain 222, the chain passing over a sprocket 223 on that shaft. Shaft 130 is in turn driven from stub shaft 172 by means of a chain 224 (see Fig. 14). This chain passes over a sprocket 226 on the shaft 172 and a sprocket 228 on a shaft 230 of a gear reduction mechanism 232. Gear reduction mechanism is in turn provided with a shaft 234 carrying a sprocket 236. A chain 238 passes over this sprocket and over a sprocket 240 on shaft 130 to drive the feed mechanism at a slower speed than the speed of the rolls.

The belts 211 and 213 pass over pulleys 242 and 244 at the outlet side of the horizontal machine to receive the fibers which have been acted on by the rollers of the horizontal machine. As shown in Fig. 1, feed chain 120 of the horizontal machine extends rearwardly beyond the beginning of the operative flight of belts 211 and 213, so that the fibers are securely gripped in the feed mechanism of the vertical machine before being released from the feed mechanism of the horizontal machine. The pulley 242 is arranged with its axis horizontally so that the belt 211 travels in a straight line. The pulley 244 is arranged with its axis in a substantially vertical plane to bring one edge of the belt substantially in contact with the upper face of a smooth bar 250. On each side of the bar 250 there is arranged a plate 252 (see Figs. 19 and 20) forming a channel for the reception of the cleaned fibrous material that has been treated in the horizontal machine. The upper edges of these plates incline rearwardly (see Fig. 17) and form a channel which receives the belt and around which the fiber is wrapped as shown in Fig. 20. This channel terminates adjacent the rear end of the machine to permit the belt to twist into a horizontal plane and align itself with the rear pulley 216. The portion of the plates 252 of the greatest height, together with the bottom guide plate 250, completely surround the belt except for a slit for the fibers at the upper edge, as shown in Fig. 20.

As the fibers from the horizontal machine come sliding on to the end of the guide 250, they are caught and carried forward by the belt and are gradually folded to form the loop about the belt as illustrated in Figs. 19 and 20. The pull on the untreated portion of the stalk created by the action of the breaking rolls and scutching drum in the vertical machine lifts the belt up against the projecting edge of the inner guide bar 252 and pinches the fibers enough to prevent any longitudinal movement of the fibers but without appreciably increasing the tractive load on the belt. When the stacks are released from the feed belt 120 of the horizontal machine, they hang vertically and are in position to be carried through the vertical machine to treat the untreated portions of the stacks. At the rear end of the vertical machine the fibers may be deposited in a catcher 300 (see Fig. 15) or they may be transferred to a conveyor to be carried to a suitable point for any further treatment that is desired. On its return trip belt 213 passes over a spring operated belt tightener 256—258, the tension of which is regulated by spring 260 to keep the belt under proper operating tension (see Figs. 12 and 13).

The operation of the machine will be apparent from the foregoing description. The fiber stalks to be treated are fed first to the horizontal machine by the conveyor 131 and a portion of the stalks is received in the feed chain 120 to convey the stalks through the machine from the right to the left in Fig. 1 of the drawings. The chains 86 carry the breaking rolls 100 and the scutching drums 102 along the portion of the stalks to be treated in the horizontal machine. The breaking rolls, rotating on their own axes in a direction opposite to the forward motion of the rolls, break the stalks and condition them for treatment by the scutching drums. The scutching drums, rotating at a greater speed than the breaking rolls and in the direction of travel of the rolls, separate the broken shives from the fibers. The sets of projecting pins 137 project through the fibrous material and straighten out the fibers as the stalks are advanced through the machine by the feed belt.

When the stalks reach the rear of the horizontal machine, they are transferred from the feed chain 120 to the belts 211 and 213, the belts engaging that portion of the fibers which have been treated in the horizontal machine and the remainder of the stalks being fed into the vertical machine by the belt 213 as illustrated in Figs. 17 to 20 of the drawings. This portion of the stalks is then treated in the same way in the vertical machine.

As stated, it is advantageous to combine the two units as illustrated but it will be apparent that the two units may be either mounted both horizontally or both vertically or in any other combination which may later be found preferable. In the drawings some of the drums and rolls have been omitted in certain of the views for clarity of presentation and to permit a more complete showing of the various drive mechanisms. It will be apparent that in each unit the machine is provided with any desired number of breaking rolls and scutching drums to properly perform the desired operations on the stalks and fibers.

The line of travel of the stalks by means of the feed chain of the horizontal machine and the belt of the vertical machine is substantially, but not quite, at right angles to the line of travel of the rolls. The conveyor is set at a slight angle so that the space between the rolls and the feed conveyor is about ⅜ of an inch more at the rear end of the machine than at the front. This causes the rolls to strike the stalks at slightly different points to properly perform the breaking and scutching operations.

At the outlet end of the vertical machine, I provide a curved plate 300 which receives the fibers as they are delivered from the feed belts 211 and 213 and when a quantity of fibers have collected in this member, they are removed by hand.

I claim:

1. A machine of the character described comprising means for feeding stalks through the machine, upper and lower conveyors traveling substantially at right angles to the line of travel of the stalks, a plurality of breaking rolls carried by the conveyors, a plurality of scutching drums carried by the conveyors, means for rotating the breaking rolls on their own axes, and means for rotating the scutching drums on their own axes in the opposite direction from the direction of rotation of the breaking rolls.

2. A machine of the character described comprising means for feeding stalks through the machine, upper and lower conveyors arranged at the front and rear of the machine and traveling substantially at right angles to the path of travel of the stalks, breaking rolls carried by the conveyors, scutching drums carried by the conveyors, means for rotating the breaking rolls on their own axes, and means for rotating the scutching drums on their own axes in the opposite direction to the direction of rotation of the breaking rolls.

3. A machine of the character described comprising means for feeding stalks through the machine, upper and lower drive chains arranged at each end of the machine and traveling substantially at right angles to the line of travel of the stalks, upper and lower rolls connected to the drive chains to travel therewith, a unitary set of chains corresponding to each drive chain and arranged adjacent thereto, each of said sets consisting of a plurality of chains, sprockets over which certain of said last mentioned chains pass to drive the set of chains, and sprockets carried by the rolls to engage another chain of each set to rotate the rolls on their own axes.

4. A machine of the character described comprising a pair of conveyor chains, rods connected at opposite ends to said chains, breaking rolls and scutching drums mounted on said rods, sprockets loosely mounted on the rods and connected to the rolls and drums, and a pair of chains traveling in opposite directions, the sprockets carried by the breaking rolls engaging one of said chains and the sprockets carried by the scutching drums engaging the other of said chains to rotate the rolls and drums in opposite directions.

5. A machine of the character described comprising a pair of conveyor chains, rods connected at opposite ends to said chains, breaking rolls and scutching drums mounted on said rods, and means for rotating the breaking rolls in one direction and the scutching drums in the opposite direction as they are moved by the chains and rods.

6. A machine of the character described comprising means for feeding stalks through the machine, upper and lower conveyors traveling substantially at right angles to the line of travel of the stalks, a plurality of breaking rolls carried by the conveyors, a plurality of scutching drums carried by the conveyors and arranged in axial alignment with some of the breaking rolls, means for rotating the rolls on their own axes, and means for rotating the scutching drums on their own axes in the opposite direction from the direction of rotation of the breaking rolls.

7. A machine of the character described comprising a pair of upper conveyor chains and a pair of lower conveyor chains, rods connected at opposite ends to the chains of each pair, breaking rolls mounted on the rods and free to revolve thereon, scutching drums mounted on some of the rods in axial alignment with the rolls thereon, and means for rotating the rolls and drums on their own axes and in opposite directions.

8. A machine of the character described comprising a pair of upper conveyor chains and a pair of lower conveyor chains, rods connected at opposite ends to the chains of each pair, breaking rolls mounted on the rods and free to revolve thereon, scutching drums mounted on some of the rods in axial alignment with the rolls thereon, means at the front of the machine to rotate the breaking rolls in one direction upon their own axes, and means at the rear of the machine to rotate the scutching drums on their own axes in the opposite direction.

9. A machine of the character described comprising means for feeding stalks through the machine, upper and lower drive chains arranged at each end of the machine and traveling substantially at right angles to the line of travel of the stalks, upper and lower rolls connected to the drive chains, upper and lower scutching drums connected to the drive chains and arranged in alignment with some of the rolls, a unitary set of chains corresponding to each drive chain and arranged adjacent thereto, each of said sets consisting of a plurality of chains, sprockets over which certain of the chains of each set pass to drive the sets of chains, and sprockets carried by the rolls and drums to engage another chain of each set to rotate the rolls and drums on their own axes.

10. Apparatus in accordance with claim 5 in which the breaking rolls consist of a plurality of sections of different diameters.

11. Apparatus in accordance with claim 4 wherein a series of pins are arranged between each pair of breaking rolls to project through the fibrous material and straighten out the fibers.

12. A machine of the character described comprising a pair of upper conveyor chains and a pair of lower conveyor chains, rods connected at opposite ends to the chains of each pair, breaking rolls mounted on the rods and free to revolve thereon, scutching drums mounted on some of the rods in axial alignment with the rolls thereon, sprockets loosely mounted on the rods and connected to the rolls and drums, and chains engaging the sprockets as the rolls and drums are moved by the first chains to rotate the rolls and drums on their own axes, the chains which drive the scutching drums traveling in the opposite direction to the chains which drive the breaking rolls to rotate the rolls and drums in opposite directions.

JOHN N. SELVIG.

REFERENCES CITED

The following references are of record in the file of this patent:

UNITED STATES PATENTS

| Number | Name | Date |
|---|---|---|
| 899,846 | Scherr et al. | Sept. 29, 1908 |
| 945,471 | De Montlord | Jan. 4, 1910 |
| 1,371,805 | O'Neill | Mar. 15, 1921 |
| 1,369,045 | O'Neill, Jr. | Feb. 22, 1921 |
| 1,390,922 | O'Neill, Jr. | Sept. 13, 1921 |
| 2,295,766 | Widger | Sept. 15, 1942 |
| 2,305,904 | Selvig | Dec. 22, 1942 |

FOREIGN PATENTS

| Number | Country | Date |
|---|---|---|
| 1,359 | Great Britain | of 1861 |
| 405,626 | Great Britain | Feb. 5, 1934 |